United States Patent [19]

Hirose

[11] Patent Number: 4,585,463
[45] Date of Patent: * Apr. 29, 1986

[54] CONCENTRATOR AND FEEDER OF SLUDGE FOR SYSTEM TO RECOVER RESOURCES FROM SLUDGE

[75] Inventor: Yasuo Hirose, Yokohama, Japan

[73] Assignee: Nippon Furnace Kogyo Co., Ltd., Tokyo, Japan

[*] Notice: The portion of the term of this patent subsequent to Mar. 26, 2002 has been disclaimed.

[21] Appl. No.: 689,105

[22] Filed: Jan. 7, 1985

Related U.S. Application Data

[63] Continuation-in-part of Ser. No. 415,963, Sep. 8, 1982, Pat. No. 4,507,127.

[30] Foreign Application Priority Data

| Dec. 21, 1981 | [JP] | Japan | 56-205251 |
| Dec. 21, 1981 | [JP] | Japan | 56-205252 |
| Dec. 21, 1981 | [JP] | Japan | 56-205253 |
| Mar. 23, 1982 | [JP] | Japan | 57-044553 |
| Mar. 23, 1982 | [JP] | Japan | 57-044554 |
| May 25, 1982 | [JP] | Japan | 57-087296 |

[51] Int. Cl.[4] .................... C02F 11/12; F23G 5/04; F26B 9/06
[52] U.S. Cl. .................... 48/111; 34/77; 34/183; 110/224; 432/144; 432/152
[58] Field of Search ............ 48/89, 111, 197 A; 201/2.5, 25, 31; 110/106, 224, 229, 232, 254; 432/143, 144, 152, 176, 199; 34/77, 183

[56] References Cited

U.S. PATENT DOCUMENTS 4,507,127 3/1985 Hirose .................... 48/89

Primary Examiner—Jay H. Woo
Assistant Examiner—Joye L. Woodard
Attorney, Agent, or Firm—Beveridge, DeGrandi & Weilacher

[57] ABSTRACT

A system for recovering resources from sludge in which sludge containing water in the amount of 90 to 70 percent is first supplied to a sludge concentrator through a forced supply equipment where the sludge is concentrated to contain a water content of a maximum of about 60 percent; then is sent to a drying furnace having a fluidized sand bed. The product obtained in the drying furnace is separated to gas and solid. After the separated gas is pressurized by a fan and is heated by a heat exchanger through a circulator passage, a portion thereof is supplied to the drying furnace as gas for drying and the remainder is sent to the sludge concentrator. The water content is then removed from the concentrated gas and the gas obtained from the sludge concentrator is used in the system as gaseous fuel. Further, the separated solid is dried and distilled through a special gasifying apparatus to recover gaseous fuel, and in addition, the separated solid is fed into ash disposal equipment; the ash generated from the gasifying apparatus is also supplied to the ash disposal equipment to allow the ash to be melted and then to allow the ash to be solidified in the ash disposal equipment and to take out the solidified massive ashes; the exhaust gases from the gasifying apparatus and ash disposal equipment are supplied to the said heat exchanger.

3 Claims, 20 Drawing Figures

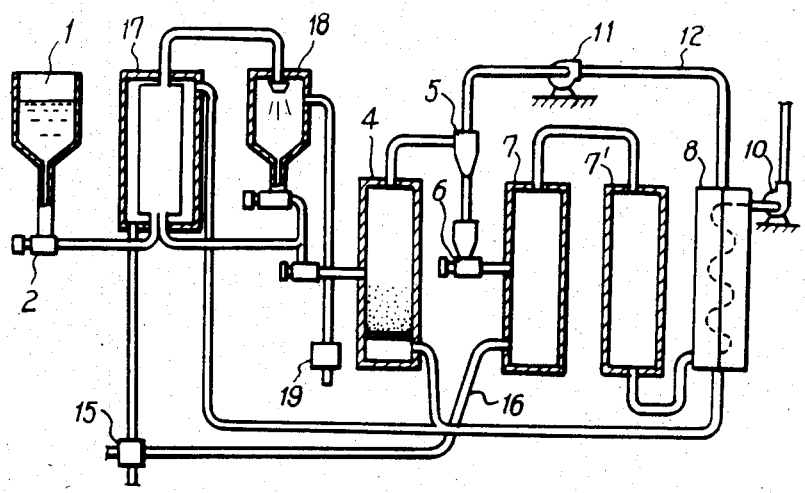
Fig-3- PRIOR ART
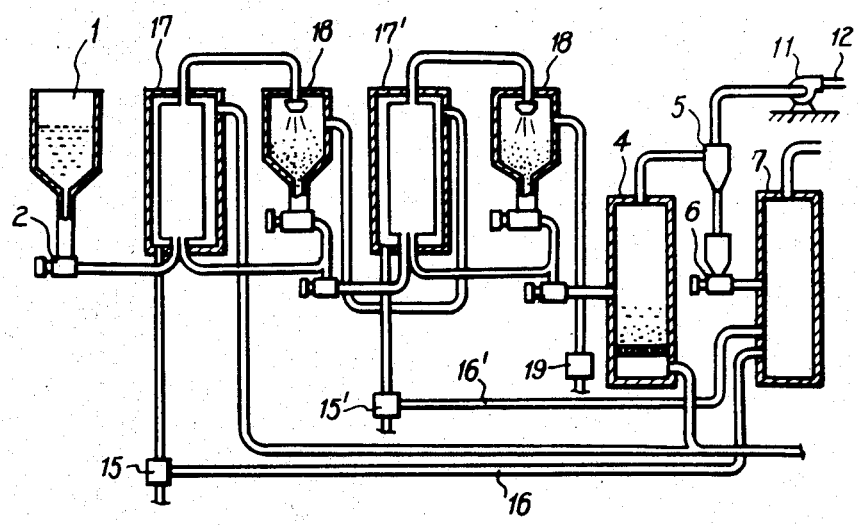
Fig-4- PRIOR ART

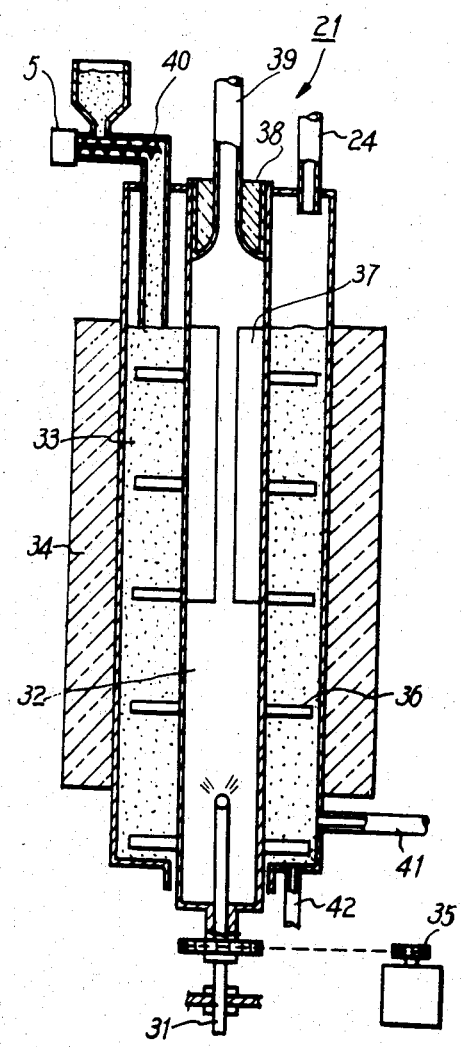
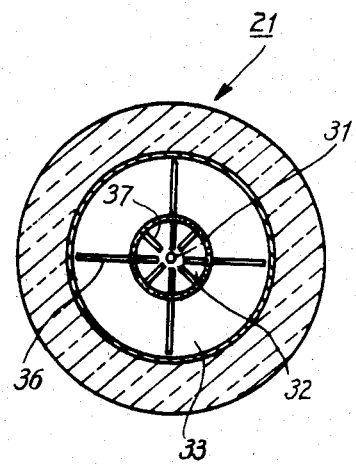
Fig-6-
Fig-7-

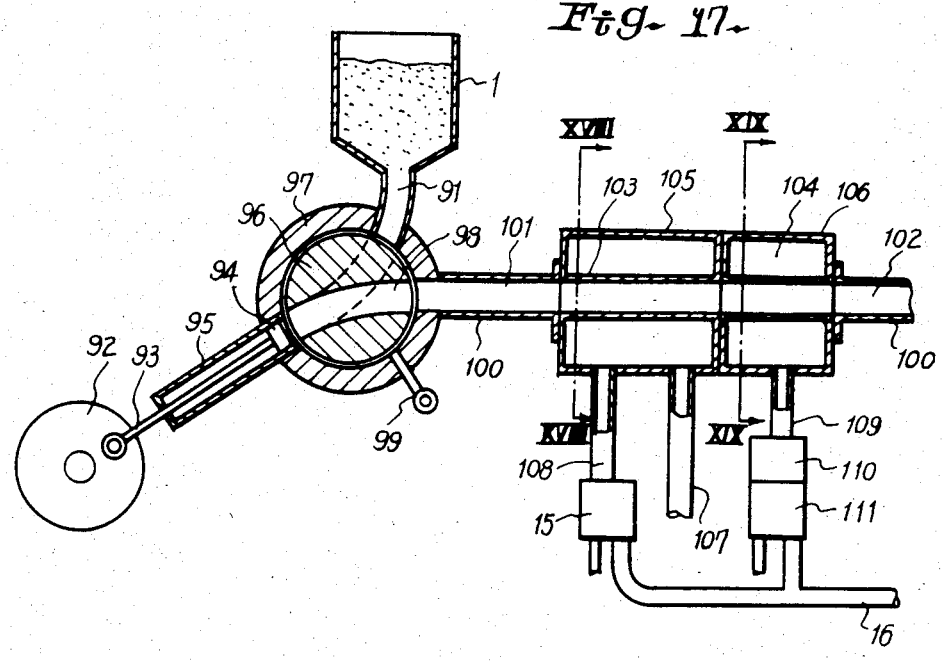
Fig-17-
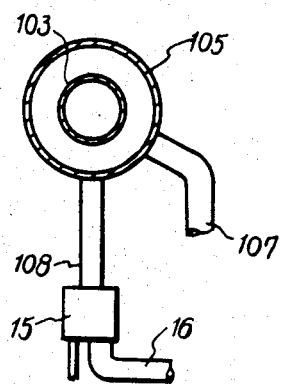
Fig-18-
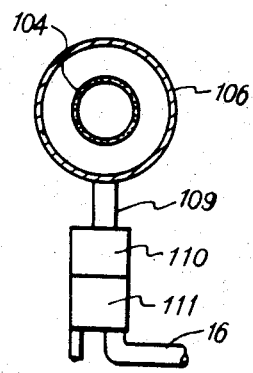
Fig-19-

CONCENTRATOR AND FEEDER OF SLUDGE FOR SYSTEM TO RECOVER RESOURCES FROM SLUDGE

REFERENCE TO A RELATED APPLICATION

This is a continuation-in-part of my copending U.S. application Ser. No. 415,963 filed Sept. 8, 1982, now U.S. Pat. No. 4,507,127 the entire disclosure of which is relied on and incorporated herein by reference.

BACKGROUND OF THE INVENTION

Conventionally, it has been considered that organic sludge requires utilization of auxiliary fuel to burn it. Applicant has conducted many studies on sludge incineration for many years and has invented a technology enabling sludge incineration utilizing less auxiliary fuel by a combustion method employing self-heating energy effectively, even of considerably low calorific sludge and/or even of sludge with high water rate as described in Japanese (application No. Sho-55-169165). FIG. 1 shows this incineration system.

Prior to the explanation of the present invention, the sludge incineration system in FIG. 1 is first described below.

Sludge having a water content reduced to 90 to 70 percent of the original water content by a mechanical dehydrogation method is contained in hopper 1. Forced supply means 2 such as a screw conveyor is provided at the bottom of the said hopper 1 to supply the sludge forcibly into heater 3. The sludge is heated by the said heater, the sludge is fluidized and then fed into drying furnace 4 having a fluidized sand bed. The dried products obtained in the said drying furnace 4 are drawn by suction of blower 11 and are led into separation means 5, and are separated to solidified sludge and dry gas is extracted from the sludge. The separated solid is fed into combustion furnaces by a constant quantity supply means such as screw conveyor 6. The combustion furnaces shown in FIG. 1 comprises a two stage sludge combustion system consisting of incomplete combustion furnace 7 and complete combustion furnace 7'; such an arrangement can largely reduce the $NO_2$ generation rate.

The combustion air for these furnaces is, after being heated in air heater 14 arranged at the periphery of the complete combustion furnace 7', supplied to incomplete combustion furnace 7 and complete combustion furnace 7' as required. The gas produced from complete combustion furnace 7' is drawn by exhaust fan 10, is passed through heat exchanger 8 and filter 9 and is exhausted.

The gas separated by the said separation means 5 is pressurized by blower 11 up to 1000 through 3000 mm water column, and is elevated to a temperature as high as 200° C. to 400° C., and is sent through circulation passage 12. A required part of the gas is fed into drying furnace 4 having the said fluidized bed for drying, and the remainder is supplied to the said heater 3 for heating.

The gas heated in the same heater 3 is led into drain separation means 15 and, after the drain is removed from the system, is then led through gaseous fuel supply pipeline 16 into combustion furnace 7, for example, as gaseous fuel.

As such, when the heating gas mainly involving steam is heated through the sludge incineration system as shown in FIG. 1, after the drain is expelled out of the system by drain separation means 15, the heated gas is fed into combustion furnace 7. Therefore, the sludge can be burnt smoothly with a relatively small fuel replenishment rate and without harmful gas discharges.

Sewage sludge is taken up as an example. The sewage sludge solid obtained when the sewage sludge is dried by a drying furnace and is separated through a separation means has heating energy from 2000 to 5000 kcal/kg and the contents thereof are ash, in the amount of about 50 percent, and of the remaining portion, about 45 percent is volatile matter and about 5 percent is fixed carbon. The volatile matter can be made into a gaseous fuel by allowing almost all of its quantity to vaporize at an atmospheric temperature from 700° C. to 450° C. The required time is shorter if the temperature is higher, as shown in FIG. 2.

Moreover, applicant can reduce the sludge quantity to be disposed of by drying furnace 4 and combustion furnace 7, by means of a concentration apparatus which heats sludge and at the same time allows the evaporation of water contained in the sludge and the expulsion of the evaporated steam out of the system at the position of heater 3, instead of merely using heater 3 to simply heat sludge. Therefore, the sludge can be incinerated smoothly, even though drying furnace 4 and combustion furnace are both compacted.

The concentration apparatus shown in FIGS. 3 and 4 is the subject of applicant's Japanese application No. Sho 56-44743 corresponding to U.S. Pat. No. 4,388,875.

In FIG. 3, the sludge transferred by forced supply means 2 installed at the bottom of sludge containing hopper 1 is first fed into heating chamber 17 to which gas for heating is being supplied. The sludge is pressurized and heated in the said heating chamber 17 and is then injected into evaporation chamber 18 under a low pressure. The gas evaporated in the said evaporation chamber 18 is drawn through the suction pipeline having condenser 19, and the water included in the gas is removed from the system by condenser 19. A part of the sludge taken from the bottom of evaporation chamber 18 is supplied to drying furnace 4 having a fluidized sand bed but almost all of the sludge is recycled to heating chamber 17 and is treated during the circulation.

The heating gas fed into heating chamber 17, after being used for heating, is taken out of heating chamber 17, lowered in temperature a little and supplied as gaseous fuel, to combustion furnace 7 through supply pipe 16, after the drain is removed from the system by drain separation means 15.

In FIG. 4, the two sets of heating chambers 17 and evaporation chamber 18 are arranged in series, and by providing two or more such sets, sludge concentration can be carried out more effectively and can supply sludge with lower water content to drying furnace 4 having a fluidized sand bed in the next process step.

INTRODUCTION TO THE INVENTION

This invention relates to a system for recovering resources from sludge. More particularly, the invention described herein relates to a method and apparatus for separation of products obtained from the drying furnace of sludge by separation means 5; for carbonization of the dried sludge products obtained by this separation, for division of these products further to ash and fuel gas, and for recovering both ash and fuel gas.

The sludge incineration system shown in FIG. 1, incinerates sludge sufficiently with the self-calorific value thereof only if the heat energy is clevery utilized, and auxiliary fuel may need to be added only for starting the incineration. However, if the heat energy is more effectively utilized, soil improvers for agriculture can be obtained, gaseous fuel can be recovered or massive ash can be obtained which is suitable for concrete aggregate. It has been determined that such resources are effectively recoverable in the initial process of sludge concentration by allowing the water content of sludge to be reduced by utilizing excess heat of the treatment.

BRIEF DESCRIPTION OF THE DRAWINGS

FIGS. 3 and 4 depict the sludge concentration equipment which was previously developed and patented by applicant.

FIGS. 6 and 7 are, respectively, vertical and horizontal sectional views showing one embodiment of the gasification apparatus used in this invention.

FIGS. 13 and 14 show, respectively, the conditions under which sludge is drawn from the hopper and sludge is forced toward the supply pipe.

FIG. 17 is a side cross-sectional view of the supply means to force sludge out into supply pipes 100 intermittently under a strong pressure and the dehydration means of this invention.

FIGS. 18 and 19 are, respectively, the cross-sectional views at XVIII—XVIII and XIX—XIX in FIG. 17.

DETAILED DESCRIPTION OF THE INVENTION

When sludge is intended to be treated, it is important to concentrate the sludge by removing the water content at the initial process stage. The object of the invention is to provide a method and apparatus to achieve this purpose.

Figure 5:
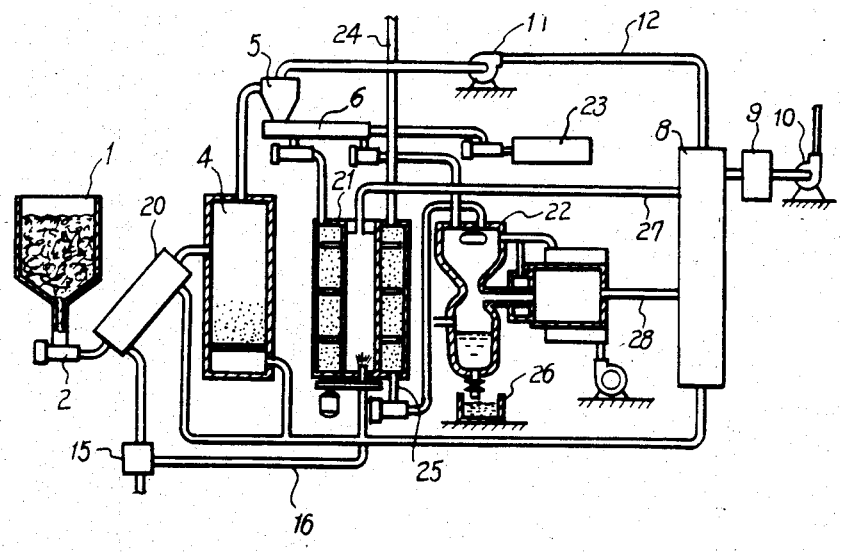
FIG. 5 is a schematic flow diagram to illustrate the system for recovering resources from sludge relating to this invention.
Figure 8:
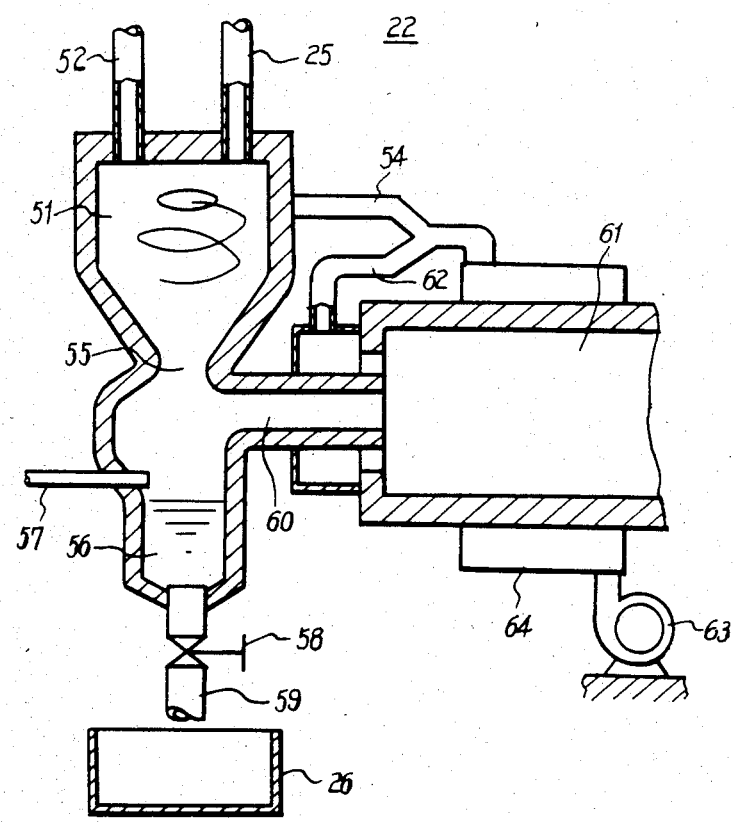
FIG. 8 is a vertical cross-sectional view showing one embodiment of ash disposer 22 used in this invention.

In FIG. 5, forced supply means 2 is installed at the bottom of sludge containing hopper 1 so that the sludge is fed into concentration apparatus 20 where the sludge is heated, dehydrated, and concentrated, and is then supplied to drying furnace 4 which has a fluidized sand bed. The dried products obtained in the said drying furnace 4 are drawn by blower 11 to separation means such as cyclone 5 and are there separated to the solidified sludge and the dried gas extracted from the sludge. The separated solid is supplied for suitable use by a constant solid supply means such as screw conveyor 6. The supply may be to gasifying equipment 21, ash disposer 22, and symbol 23 which represents the application of the said solid to be used, as is, as a soil improver for agricultural purposes.

The gasifying equipment 21 has a construction so that the solid supplied to a distillation or a carbonization chamber around the combustion chamber is distilled or carbonized by the heat of combustion from the combustion chamber located at the center of the apparatus, and the gas for promoting the distillation or the carbonization enters from the bottom of the apparatus, and gaseous fuel is recovered from pipe 24.

The ash taken out of the bottom of the said distillation chamber is fed into ash disposer 22 by ash supplier means 25.

The ash disposer 22 has a cyclone combustion chamber included therein which receives the solid and the ash obtained from the said gasification chamber 21. The massive ash solidifying method of ash with water is made possible by a water tank at the bottom of disposer 22.

The exhaust gas from gasification equipment and the exhaust gas from the second stage combustion chamber are led to heat exchanger 8 through exhaust gas pipeline 28 and are discharged by exhaust fan 10 through filter 9, after they are cooled. The gas obtained from the said separation means mainly containing steam, is pressurized by blower 11, and is carried through circulation passage 12 and is then elevated in temperature through heat exchanger 8. A part thereof, namely, a quantity required for drying sludge to be supplied to drying furnace 4 is fed by recycle into the said drying furnace, and the remaining gas is sent to concentration apparatus 20 as dehydration gas. The gas heated and dehydrated by the said concentration apparatus and the gas volatilized from the sludge by the said concentration apparatus are sent through gaseous fuel supply pipeline 16 and are recovered as gaseous fuel after the drain is expelled out of the system. This gaseous fuel is fed to the gas burner of gasification equipment 21, for example.

The fuel gas extractor is described in greater detail in FIGS. 6 and 7 and is the subject of my application filed concurrently herewith entitled "Fuel Gas Extractor From Dried Sludge for System To Recover Resources From Sludge".

The solid obtained from separation by separation means 5 has generally been dried to include 5 percent or less of water and powder about 0.2 mm in diameter. The powder is agitated in the said distillation chamber having an atmospheric temperature of from 500° C. to 700° C. while the gas for promoting volatilization is supplied. Almost all of the volatile matter in the powder is volatilized within 90 seconds, and this volatilized gas is recovered through gaseous fuel exit pipe 24; about one-half of the powder remains as ash. The ash left after the volatilization is removed by way of ash exit pipe 42 and is carried to ash disposal device 22 by screw conveyor 25.

Figure 1:
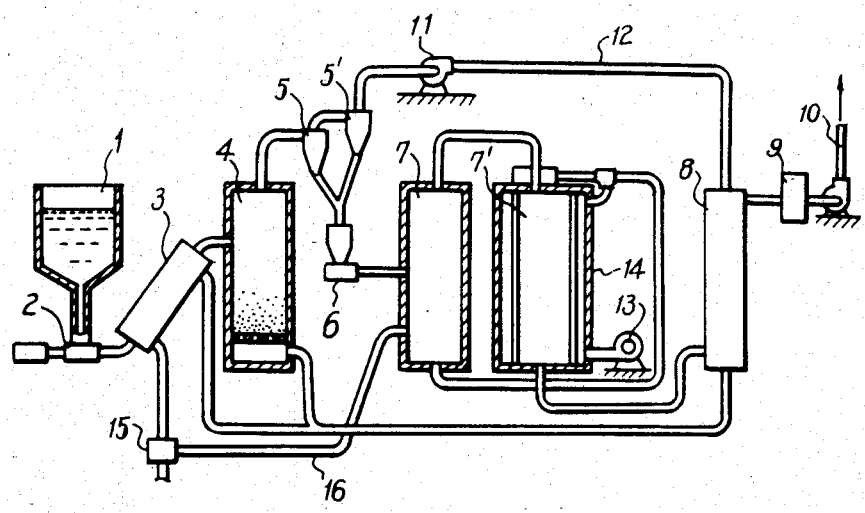
FIG. 1 is a flow diagram of the sludge incineration system which was previously developed by applicant.
Figure 2:
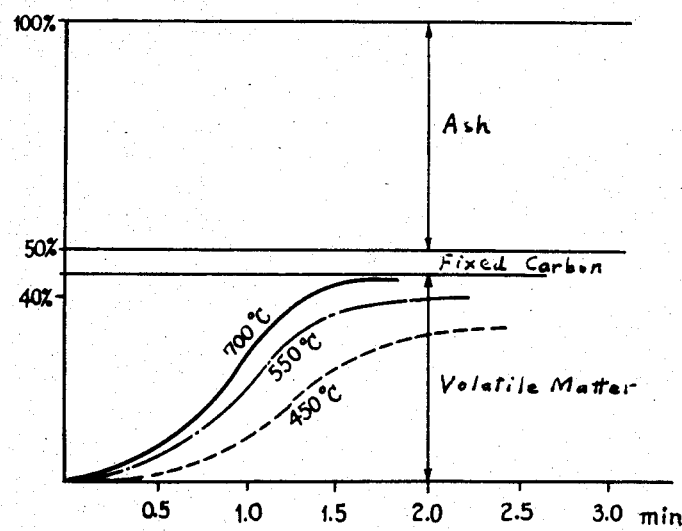
FIG. 2 is a graph showing the compositions of the dried sewage sludge solid and the volatilization speed of the volatile matter at the respective temperatures.

FIG. 2 shows the graph to indicate the contents and the carbonization characteristics of the dried sludge supplied to the system. As shown in FIG. 2, approximately 50 percent of the dried sludge is ash and the ash taken out as the result of the carbonization is alkaline salt mainly consisting of $SiO_2$ and $Al_2O_3$ containing considerable amounts of Na and K as salts. These salts are taken out of ash discharge port 42 of this apparatus at an approximately constant rate.

The greater portion of the remaining part, i.e. about 45 percent is volatile matter and approximately 5 percent is fixed carbon. As may be seen, FIG. 2 indicates that this volatile matter can almost be carbonized by allowing it to be held up for about 1.5 minutes at a temperature from 700° C. to 500° C. in carbonization chamber 33, however the carbonization is not so smooth at a temperature less than 500° C.

The ash taken out of ash discharge port 42 provided for carbonization chamber 33 may be changed to concrete aggregate separately by a dried sludge ash disposer. The ash disposer is the subject of my application filed concurrently herewith entitled "Ash Disposer For System To Recover Resources From Sludge".

Applicant has developed concentration equipment which is far simpler than that shown in FIGS. 3 and 4 and which can easily increase the concentrated degree of sludge by connecting several sets in series before the system for recovering resources from sludge. If sludge is heated and dehydrated by concentration equipment 20 to reduce water contained in the sludge, the volume is greatly decreased as the water is removed in the later several processes; therefore, such disposers can be compacted very much and all the processes can smoothly be carried out, and in addition, resources can effectively be recovered.

Figure 9:
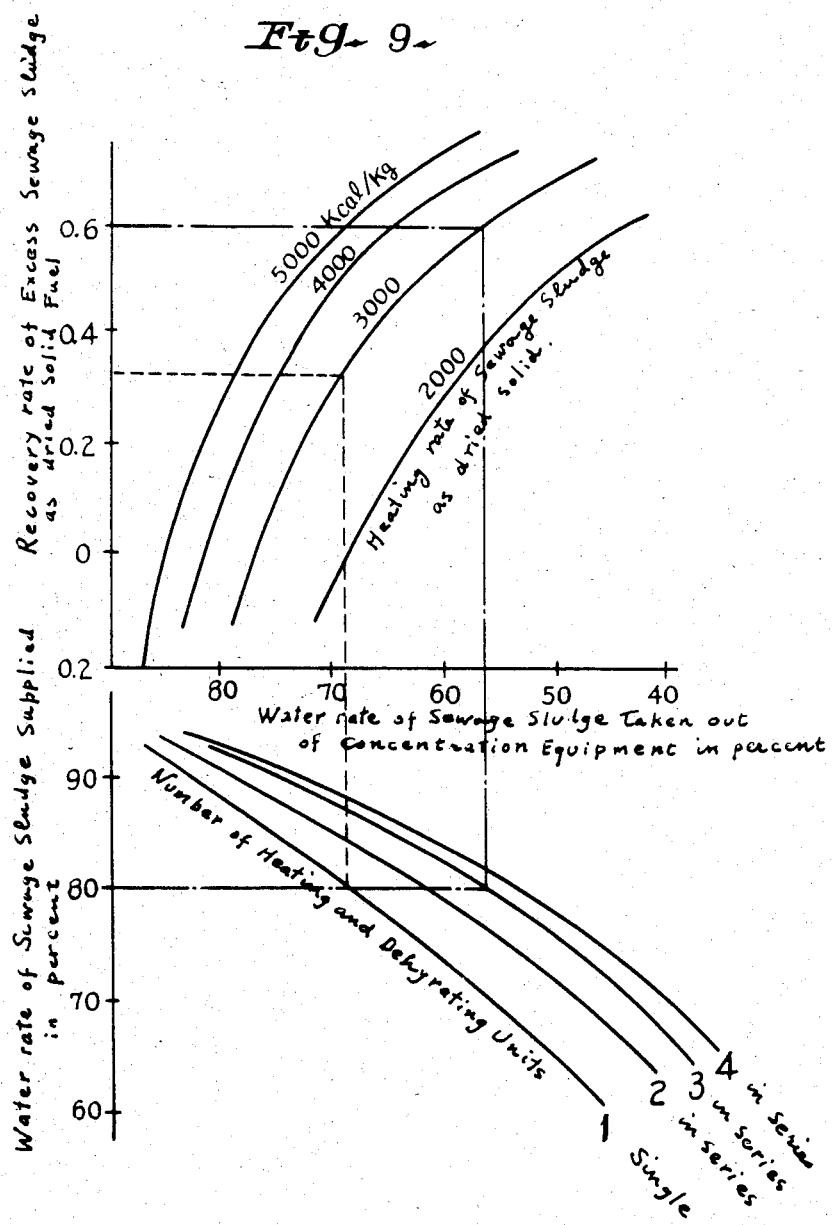
FIG. 9 is a graph showing the dehydration effect of the concentration equipment used in this invention.

In FIG. 9, the lower ordinate gives the water rate in percent of sewage sludge supplied to the system, the abscissa is water rate in percent of sewage sludge taken out of the concentration equipment. The four curves above show, respectively, that the concentration degrees differ, from the number of the heating and dehydrating units of the concentration equipment. In the upper graph the ordinate is the percentage of the dried sewage sludge solid that may be obtained by recovering resources from sewage sludge as a heat source. The four curves show respectively that the heat source percentage recovered differs from the calorific values in dried sewage sludge solid, and each of them gives the calorific value, 2000, 3000, 4000 or 5000 kcal/kg.

For example, if the water rate of sewage sludge supplied is 80 percent and the number of the heating and dehydrating units of the concentration equipment is one, the water rate of sewage sludge taken out of the concentration equipment is 68 percent, and about 30 percent of the solids can be recovered as a heat source, if the calorific value of dried sewage sludge solid is 3000 kcal/kg. If the water rate of sewage sludge taken out of the concentration equipment is 80 percent and the calorific value of dried sewage sludge is 3000 kcal/kg when the number of the heating and dehydrating units of the concentration equipment is three, the water rate of sewage sludge taken out of the said concentration equipment is 60 percent and heat recovery, about 60 percent can be obtained by this system for recovering resources from sludge.

That is, when the three heating and dehydrating units are installed and sewage sludge in as much as 100 tons containing 80% water is treated every day, the composition of sewage sludge supplied is 20 tons solid per day and 80 tons water per day. The 80 tons/day of water is reduced to 30 tons/day by the concentration equipment having the three heating and dehydrating units, while the 20 tons/day of solid is unchanged. As a result, the sewage sludge, after being taken out of the said concentration equipment, consists of 20 tons solid per day and 30 tons water per day, for a total of 50 tons/day. This is about one-half as compared with the content as supplied and the solid, 60 percent or 12 tons/day or 3.6 million kcal/day can be recovered as a heat resource. In addition, the installation capacity in the equipment performing the several processes after the concentration equipment may greatly be reduced.

Figure 10:
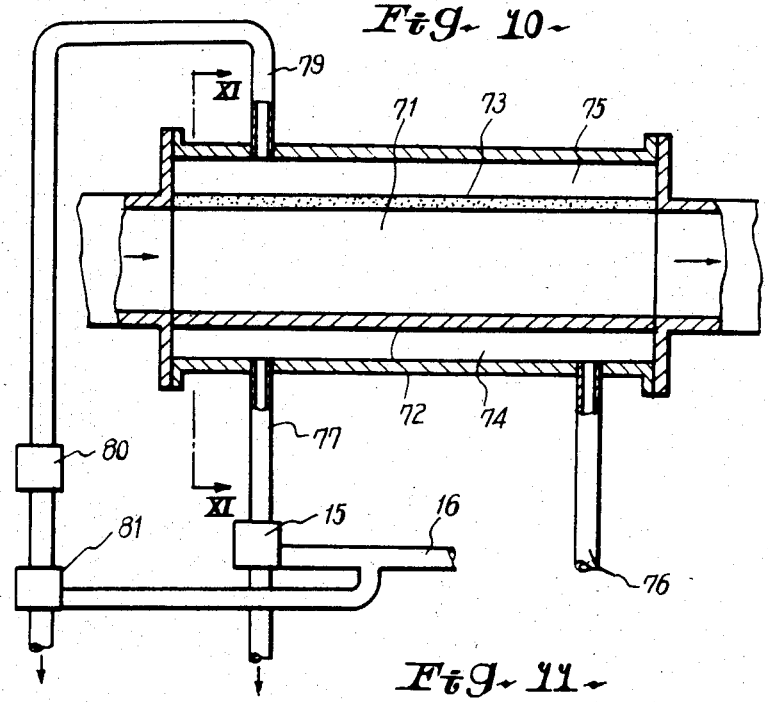
FIGS. 10 and 11 are respectively the side and IX—IX cross-sectional drawings of the concentration equipment with one heating and dehydrating unit of the invention for recovering resources from sludge.
Figure 11:
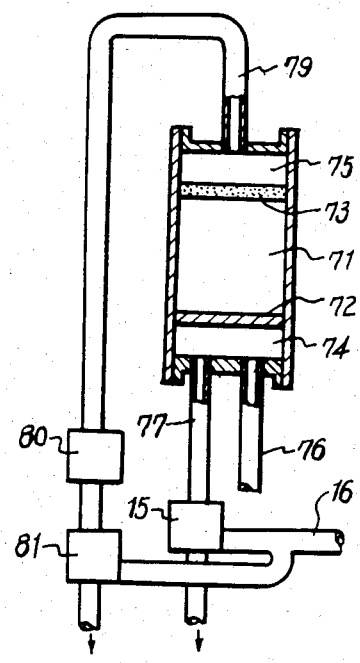

The concentration equipment 20 installed after forced supply means 2 in the system for recovering resources from sludge relating to this invention shown in FIG. 5 consists of, for example, one heating and dehydrating unit having the construction given in FIGS. 10 and 11. Sludge supply passage 71 is provided for at the center. Sludge is sent from the left to the right as shown by the arrow and there is a forced sludge supply means such as screw-type extruder 2 at the left and drying furnace 4 having a fluidized sand bed at the right. The one side wall of the said supply passage 71 is made of heat conductive material 72 such as a metallic nonporous plate, the other side wall 73 is, for example, made of metal mesh, sintered metal or porous ceramic with many holes from 2 to 100 microns in diameter, and on the outside of them, jackets 74 and 75 are respectively mounted. Heating gas feed pipe 76 is connected with jacket 74 having the said heat conductive wall 72 and exhaust pipe 77 with drain separator 15 is fitted to jacket 74. The suction pipe with cooler 80 and drain separator 81 is also fitted to jacket 75 having the said ventilating porous wall 73.

The heating gas supplied to this heating and dehydrating unit through feed pipe 76 is sent through gaseous fuel supply pipe 16 and the gaseous fuel is recovered after the gas has cooled, is discharged through exhaust pipe 77 and the drain has been removed from the system. Jacket 75 is connected with suction pipe 79 having cooler 80, and the inside is under a negative pressure of about 0.5 $kg/cm^2 abs$.

The water content and the volatile matter in sludge is actively vaporized. The gas drawn from the said suction pipe 77 is sent through gaseous fuel supply pipe 16 and the gaseous fuel is recovered after the gas is cooled and the drain is removed out of the system.

Figure 12:
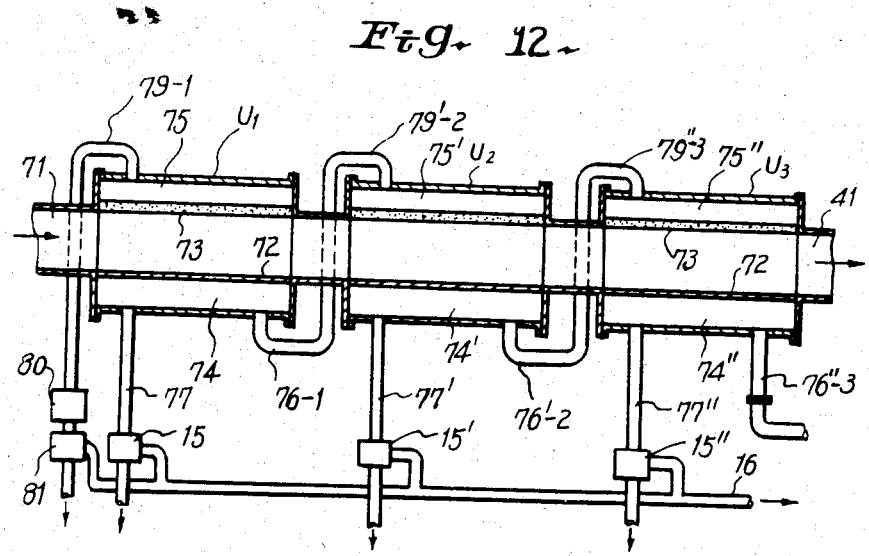
FIG. 12 is a side cross-sectional drawing of the concentration equipment having three heating and dehydrating units according to the invention for recovering resources from sludge.

Further, concentration equipment 20 installed downstream of forced supply means 2 in the system for recovering resources from sludge relating to this invention can consist of the heating and dehydrating units, including several ones in series. For example, FIG. 12 gives the three heating and dehydrating units, $U_1$, $U_2$ and $U_3$ connected in series. That is, cooler 80 and drain separator 81 are mounted on suction pipe 79-1 of the first heating and dehydrating units, $U_1$. In addition, exhaust pipes 77, 77' and 77" respectively with drain separator 15, 15' and 15" are fitted, respectively, to heating and dehydrating units $U_1$, $U_2$ and $U_3$. High temperature and high pressure heating gas supply pipe 76-3 is connected only to jacket 74″ with heat conductive wall of the third heating and dehydrating unit $U_3$; supply pipe 76-1 of the first heating and dehydrating unit $U_1$ is connected with suction pipe 79′-2 of the second heating and dehydrating unit $U_2$, and supply pipe 76′-2 of the second heating and dehydrating unit $U_2$ is being connected with suction pipe 79″-3 of the third heating and dehydrating unit $U_3$.

For the concentration equipment consisting of the three heating and dehydrating units in series as shown in FIG. 12, the pressure in jackets 73-2 and 73-3 is about 0.5 kg/cm$^2$ abs.; therefore, the water evaporating temperature is about 80° C. However, pressure in jackets 73-2 and 75-1 is about 0.2 kg/cm$^2$ abs. and the water evaporating temperature becomes about 60° C.; pressure in jacket 73-1 is about 0.1 kg/cm$^2$ abs. and the water evaporating temperature becomes 40° C.; therefore, the water content in sludge can actively be vaporized in each unit.

Moreover, at the positions of forced supply means 2 and concentration equipment 20 in the system for recovering resources from sludge relating to this invention shown in FIG. 5, such equipment can be used as alternatives; that is, a concentration equipment having one heating and dehydrating unit is operated with a supply means to force the sludge toward a supply pipe intermittently under a strong pressure and a concentration equipment consisting of the said heating and dehydrating units, several ones in series. The supply means to force the sludge toward the supply pipe intermittently under a strong pressure is shown in FIGS. 13 and 14.

Exit pipe 91 is fitted to the bottom of sludge storage hopper 1, piston 94 is arranged to be reciprocated by crank shaft 92 and connecting rod 93 is engaged in cylinder 95. Ball valve 96 is contained in casing 97 at the force end of the said cylinder 95, curved passage 98 is made in the said ball valve, and operation lever 99 allowing the ball valve to be turned is interlocked with the reciprocating motion of piston 94.

Figure 13:
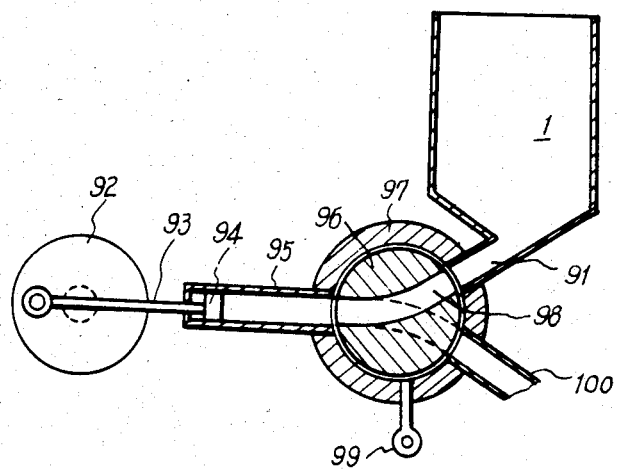
FIGS. 13 and 14 are, respectively, the side cross-sectional drawings which show the supply means to force sludge into supply pipe 100 intermittently under a strong pressure at the side of the concentration equipment used in combination with forced supply means 2 according to the invention for recovering resources from sludge.
Figure 14:
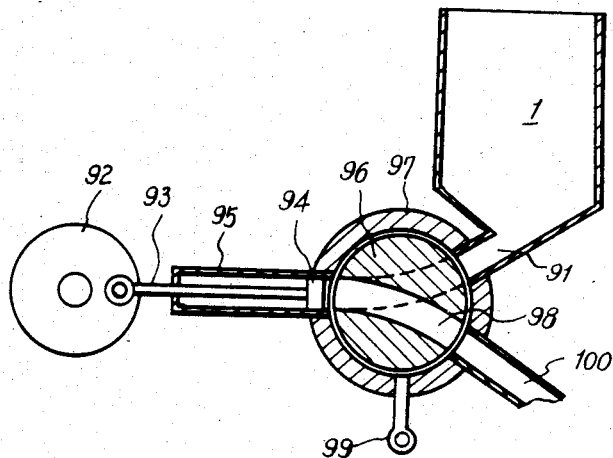
Figure 15:
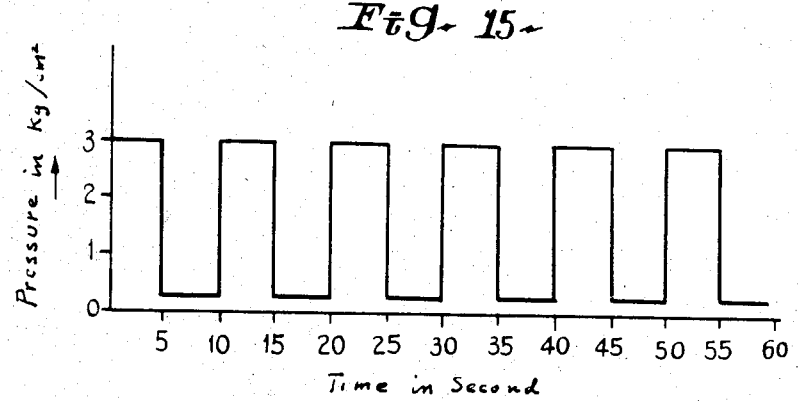
FIGS. 15 and 16 are the graphs showing the time lapse of the change in pressures in supply pipe 100 at the positions before and after the heating and dehydrating devices connected with respective supply pipes 100 of the concentration equipment as combined with the supply means to force the sludge toward the said supply pipes 100 intermittently under a strong pressure as an example.
Figure 16:
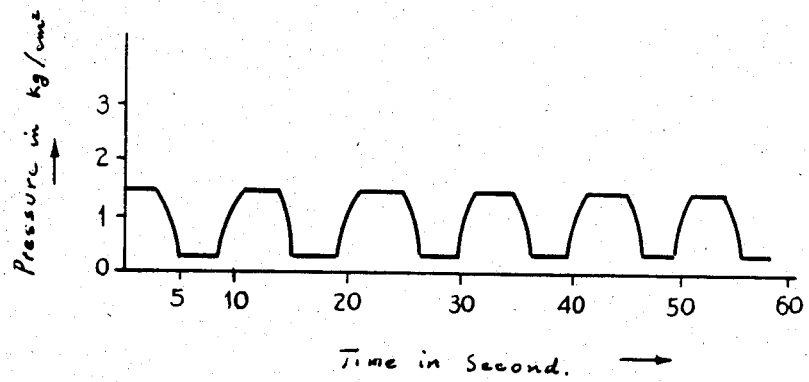

As shown in FIG. 13, when piston 94 is moved backward to be in a drawing or suction mode, the fore end of curved passage 98 in the said ball valve is communicated with exit pipe 91. On the other hand, when piston moves forward to assume the forcing out mode, the fore end of curved passage 98 in ball valve 96 is in communication with supply pipe 100. The graphs shown in FIGS. 15 and 16 illustrate the change in pressures with time at the upstream end 101 of the said supply pipe 100 before sludge is introduced into the heating and dehydrating unit and the change in pressures with time lapse at the downstream end 102 of the said supply pipe 100 after the sludge passes through the one or several heating and dehydrating units, when the said supply means by which the sludge is forcibly pushed out toward that supply pipe intermittently operates under a strong pressure.

The heating and dehydrating unit operated with the said intermittent supply means above is explained according to FIGS. 17, 18 and 19 as follows.

A sludge concentrator according to the invention has, in FIGS. 17 through 20, a supply pipe 100 provided with several heating and dehydrating units. Further, the sludge concentrator of the invention adopts a feeder, which has been described in FIGS. 13 and 14, at the position of supply means 2 in FIG. 5. The sludge concentrator according to the invention is described by an embodiment thereof given in FIGS. 17, 18, 19 and 20.

Figure 20:
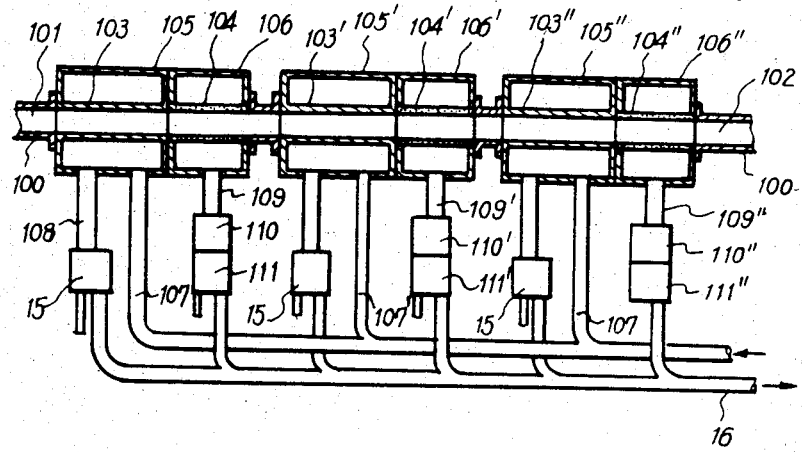
FIG. 20 shows the concentration apparatus of this invention provided with the three heating and dehydrating units in series illustrated in FIGS. 17, 18 and 19 as an example. This concentration equipment has also the dehydrating and the heat energy recovering effects explained according to FIG. 9.

FIG. 17 shows a sludge concentrator providing only one heating and dehydrating unit for pipe 100 feeding sludge with an intermittent strong pressure applied forcibly, and FIG. 20 gives a sludge concentrator with three heating and dehydrating units for said pipe 100 as an example of sludge concentrator having two or more heating and dehydrating units.

A part of heat conductive pipe 103 and a part of ventilating porous pipe 104 connected therewith are fitted to supply pipe 100. Jacket 105 is provided for covering the said heat conductive pipe, and jacket 106 is also provided for covering the said ventilating porous pipe 104. Heating gas supply pipe 107 and exhaust pipe 108 having separator 15 are fitted to jacket 105 for covering the said heat conductive pipe. Cooler 110 and suction pipe 109 with drain separator 111 are mounted on jacket 106 for covering the said ventilating porous pipe.

The gas for heating supplied to this heating and dehydrating unit through feed pipe 107 is sent through gaseous fuel feed pipe 16. After the gas is used for heating, it is discharged through exhaust pipe 108 and the drain is removed out of the system, and the gaseous fuel is recovered.

A sludge concentrator according to the invention uses as shown in FIG. 17, first a feeder supplying sludge intermittently with a strong pressure the same as that indicated in FIGS. 13 and 14. For example, discharge pipe 91 is fitted to the bottom of a hopper for containing the sludge, piston 94 having rotary body 92 and connecting rod 93 is provided in cylinder 95, ball valve 96 on the top of said cylinder 95 is involved in casing 96, and said connecting rod allows ball valve 96 to rotate by interlocking with the reciprocating motion of piston 96. As shown in FIG. 13, when piston 94 goes back to the suction mode, the tip of curved passage 98 in said ball valve 96 is in communication with discharge pipe 91 on the bottom of hopper 1. However, as shown in FIG. 14, when piston 94 goes forward for the delivery mode, the tip of curved passage 98 in said ball valve is in communication with feed pipe 100 provided to supply sludge to the next process stage, i.e., a drying furnace having a fluidized sand bed.

By this heating and dehydrating unit, sludge pressures in feed pipe 100 are repeatedly increased intermittently and then become normal. The sludge is heated up to a high temperature with heating as fed into jacket 105, however, the sludge including water and volatile matter may not easily be evaporated and volatilized under a high pressure. If the sludge is placed under a normal pressure at the next moment, the water and the volatile matter in the sludge are actively vaporized. Even though pressurized again, such water and volatile matter exist in the sludge as compressed gas. Later when the sludge including the compressed gas, water and liquid volatile matter is transferred up to ventilating porous pipe 104, because a pressure in jacket 106 with suction pipe 109 is negative, the water and the volatile matter are actively vaporized, and this vaporized gas is immediately drawn from jacket 106 to suction pipe 109 with a cooler. The withdrawn vaporized gas is cooled by cooler 110 and is recovered as gaseous fuel by the pipe 16, after the drain is removed out of the system by drain separator 111.

One or several heating and dehydrating units may be installed on this feed pipe 100. When the said heating and dehydrating unit is installed, feed pipe 100 is composed of heat conduction tube 103 and ventilative porous pipe 104 connected with the former. In addition, heating jacket 105 covering heat conduction tube 103 is provided. As shown in FIG. 18, heating gas is supplied from heating gas feed pipe 107 to said jacket 105. The feed gas is pressured, for example, to approximately 1000 mm water column and is heated to 200° C. through 400° C. Further, delivery pipe 108 is mounted on the lower end of said heating jacket 105, drain separation means 15 is provided for said delivery pipe 108 and is designed so that the remaining gas from which the drain is taken out of the system is supplied, for example, to a combustion furnace through feed pipe 16.

Dehydration jacket 106 is provided to cover ventilative porous pipe 104 connected with said heat conduction tube and is laid downstream thereof. As shown in FIG. 19, suction pipe 109 is mounted on the lower end thereof, cooling means 110 and drain separation means 111 are provided for said suction pipe 109, and the remaining gas from which the drain is removed out of the system is designed so as to be supplied, for example, to a combustion furnace through feed pipe 16. Cooling means 110 is installed to be able to make a considerable negative pressure in jacket 106 according to cooling degree thereof. Therefore, it is possible to suck gas generated by heating sludge within said jacket 106 for concentrating the sludge.

FIG. 20 shows three heating and dehydrating units in accordance with FIGS. 17, 18 and 19, connected in series. The apparatus as shown in FIG. 20 has the same effect as shown by the graph in FIG. 9.

As shown in FIG. 20, the invention makes it possible to install several heating and dehydrating units consisting of heating jacket 105 covering sludge feed pipe 100 and heat conduction tube 103 and dehydration jacket 106 covering ventilative porous pipe 104 adjacent to each other.

In the sludge concentractor according to the invention, a change in pressure with passing time of sludge at the entrance position 101 of the heating and dehydrating units installed on feed pipe 100 mentioned above is shown in FIG. 15; a change in pressure with passing time of sludge after passing through one or several heating and dehydrating units; namely, a sludge pressure at position 102 in feed pipe 100 before the sludge is supplied to the drying furnace having a fluidized sand bed differs depending on concentration degree in the concentrator, however, the change, becomes, for example, as that shown in FIG. 16.

When the sludge is in heat conduction tube 103, the water content thereof is not so readily evaporated under a high pressure even when the sludge is elevated to a high temperature. However, as the sludge proceeds to a region of low pressure at the next moment, the water content of the sludge is actively vaporized, and if a pressure is applied to the vaporized water, the steam is involved in the sludge as compressed steam. When the steam is then transferred to ventilative porous pipe 104, vaporization actively occurs because a negative pressure exists in jacket 106, and the vaporized gas is recovered in jacket 106.

This invention is, as mentioned above, featured as a sludge supply system where a high and a low pressure are repeated in sludge feed pipe 100 together with the combination of the sludge supply system and the heating and dehydrating unit(s) which is a suitable apparatus especially to remove the water content from viscous sludge and to concentrate the sludge. Particularly, it is possible for the water content of the sludge to be reduced to a low point by providing several heating and dehydrating units in series.

For example, if the dehydration effect of an apparatus according to this invention is compared with a conventional forced constant sludge supply system such as a combination of a screw conveyor sludge supply system and a heating and dehydrating unit(s), the dehydration rate is approximately three times larger using a system according to this invention than that by a constant pressure supply system.

For this invention, it is feasible to reduce the water content of sludge from 80 to 60 percent by installing two or three dehydration units in series. However, for a combination of a screw conveyor and a heating and dehydrating unit, even if three units are installed in series, it is difficult for sludge with water content of 80 percent to be reduced down to a water content of 70 percent.

The water content of sludge is, through a concentrator according to this invention, greatly reduced thereby resulting in a low volume and is heated. Thus, the capacity for drying and burning in the furnaces can be scaled down to approximately one half and can still easily treat the sludge.

A concentrator and a feeder of sludge in a system to recover resources from sludge according to the invention cannot only burn sludge smoothly without fuel replenishment, but also makes it easy to recover useful resources such as fertilizer, gaseous fuel, construction materials, etc. from sludge.

Further modifications and variations will be apparent to those skilled in the art from the foregoing description and will be encompassed by the claims appended hereto.

I claim:

1. A sludge concentration apparatus for recovering resources from sludge comprising a sludge supply means and at least one dehydration means, said sludge supply means adapted to push sludge out into feed means for conveying to said dehydration means including a heat conductive pipe means connected to a ventilating porous pipe means, a first jacket covering said heat conductive pipe means, a heating gas feed pipe means and an exhaust pipe means fitted to the said first jacket, a second jacket covering said ventilating porous pipe means, suction pipe means fitted to said second jacket whereby gaseous fuel products may be recovered.

2. Dehydration apparatus for a system for treating sludge containing water comprising a central sludge feed tube having two opposing walls, one wall of which is heat conductive and the other wall of which is porous, a first jacket surrounding said feed tube wall which is heat conductive and a second jacket surrounding said tube wall which is porous, a heating gas feed pipe fitted to said first jacket, an exhaust gas pipe fitted to said first jacket for transmitting exhaust gas from said first jacket through a drain separator to a gaseous fuel feed pipe, a suction pipe fitted to said second jacket for transmitting gas from said second jacket through a cooler and a drain separator to said gaseous fuel feel pipe.

3. Dehydration apparatus according to claim 2 further comprising a plurality of first and second jackets and the suction pipes of downstream second jackets are connected with the next upstream heating gas feed pipe.

* * * * *